Patented July 12, 1938

2,123,419

UNITED STATES PATENT OFFICE 2,123,419

ROOFING GRANULE AND METHOD OF COLORING SAME

Henry R. Gundlach, Baltimore, Md., assignor to Central Commercial Company, a corporation of Illinois No Drawing. Application October 3, 1935, Serial No. 43,388

3 Claims. (Cl. 91—70)

This invention relates to composition roofing, and, more particularly, to colored granules for use on roofing material and the process of coloring the granules.

One of the objects of the invention is the provision of new and improved roofing granules having novel means for cementing the color pigment to the surfaces of the granules.

A further object of the invention is the provision of a new and improved method of coloring granules for use on composition roofing.

A further object of the invention is the provision of a new and improved method of attaching color pigment to roofing granules without damaging the granules or injuring the color or luster of the color pigment.

A still further object of the invention is the provision of a new and improved colored granule that is inexpensive to manufacture, which is durable and one in which the color pigment is firmly secured.

Other and further objects and advantages of the invention will appear as the description proceeds:

In the manufacture of composition roofing, it is common practice to impregnate strips of fibrous material with a bituminous composition and then by a suitable binder of weather resisting material secure granules to the surface of the strips. These granules may be of natural color—that is, they may be made from stone, slate or the like having a natural color of the desired hue. In other instances, the granules are artificially colored, the color pigment being attached to the surface of the granules by a suitable cement or binder. More or less difficulty has been experienced in the use of artificially colored granules because of the tendency of the cement to chip, crack, dissolve or to be otherwise affected by the weather. The present invention seeks to eliminate these difficulties by the provision of a weather resisting cement for securing color pigment to the surface of the granules.

It has also been proposed to fuse the binder onto the granules but the heat required to fuse certain binder materials is such as to materially affect the luster of certain pigments and is such as to prohibit the use altogether of certain other pigments.

In the present invention a moderate amount of heat is employed, but not sufficiently high to injuriously affect the color pigments employed.

The granules to be colored are reduced and screened to the proper size in the usual manner. They may be made from any suitable material, such as slate, quartz, shale, traprock and the like.

The solid constituent of the binder employed is preferably in the form of a powder which with the addition of phosphoric acid accompanied by a moderate amount of heat will form a cement for attaching the color pigment firmly to the surface of the granules. For convenience of description, this powdered material will be referred to as binder powder.

The binder powder may be made from compounds of one or more of the common metals of groups III, IV, VII and VIII of the periodic classification of the elements which are capable of forming sesquioxides. The compounds of these metals most suitable are the oxides, hydroxides or carbonates thereof. Any compounds of these elements capable of forming a phosphate with phosphoric acid may be used, as, for instance, the oxide or hydroxide of aluminum, titanium and cobalt; and the oxide, carbonate or hydroxide of manganese, iron and nickel.

The material for the binder powder is reduced to powder form in any suitable manner, as in a ball mill, and it is then ready for use. In coloring the granules, the binder powder, color pigment and granules may all be mixed together, or the color pigment and binder powder be first mixed together in dry form and then mixed with the granules. The granules are preferably first moistened, after which the mass of binder powder and color pigment are mixed together. After the mass is thoroughly mixed, an aqueous solution of phosphoric acid is applied to form a cement coat on the granules and the whole mass dried by heating to a temperature above 400° F. and below 800° F., preferably between 450° and 600° F., and simultaneously agitated to prevent agglomeration.

The following formula of material for coloring each ton of granules green gives satisfactory results, and is here given by way of example only:—

| | Pounds |
|---|---|
| Phosphoric acid 75% | 40 |
| Oxide of one of the metals named herein in a sufficient quantity to chemically react on substantially all the phosphoric acid, as, for instance, if aluminum oxide ($Al_2O_3$) is used, about | 10 to 15 |
| Chrome oxide (green color pigment) about | 18 |

The exact compositions of the reaction products of the acid and powdered material are not definitely known, and, consequently, I do not desire to be bound by any statements of theory relative thereto. It is probable that during the heating operation, for instance, some of the phosphates may be converted into pyro-phosphate. It is also likely that in some of the reactions forming the ultimate product, basic or oxy-phosphates may also be formed. The term phosphate is therefore intended to include the reaction products of phosphoric acid and the binder powder.

Preferably, though not necessarily, the cement is applied in a thin coat. It has also been found by experiment that the application of heat, as outlined above, gives good results. This may be done in a rotary kiln which will also agitate the mass to prevent agglomeration.

The insoluble silicates of any of the above enumerated metals and of any of the metals of Group II that unite with silica, such as aluminum silicate, iron silicate, calcium silicate, slate dust and the like may also be used with satisfactory results. In preparing the silicate, the same is reduced to powder form in a ball or hammer mill after which it is mixed with the pigment which has also previously been reduced to powder form, as described above. The phosphoric acid is then added and the mixture heated and simultaneously agitated as in the foregoing examples.

It is understood that the compounds herein specified are by way of example only, and that the claims are not to be limited except by the prior art.

I claim as my invention:

1. A method of coloring granules of mineral matter for use on composition roofing which comprises attaching color pigment to the surface of the granules with a thin layer of weather-proof cement, comprising the reaction product of substantially 40 lbs. of phosphoric acid of 75% strength with from 10 to 15 pounds of a compound of one of the common metals of Groups III, IV, VII and VIII of the Periodic Classification of the Elements which is capable of forming a sesquioxide for each ton of granules, heating the mass between 450° F. and 600° F. and simultaneously agitating the mass to prevent agglomeration.

2. A method of coloring granules of mineral matter selected from the group consisting of slate, quartz, shale and traprock for use on composition roofing which comprises attaching color pigment to the surface of the granules with a thin layer of weather-proof cement comprising the reaction product of phosphoric acid with a compound of one of the common metals of Groups III, IV, VII and VIII of the Periodic Classification of the Elements which is capable of forming a sesquioxide, heating the mass between 400° F. and 800° F. and simultaneously agitating the mass to prevent agglomeration.

3. A colored granule for use on composition roofing comprising a body of mineral matter selected from the group consisting of slate, quartz, shale and traprock and a color pigment attached to the surface of said body by a thin layer of weather-proof cement comprising the reaction product of heating between 400° F. and 800° F. phosphoric acid with a compound of one of the common metals of Groups III, IV, VII and VIII of the Periodic Classification of the Elements which is capable of forming a sesquioxide.

HENRY R. GUNDLACH.